United States Patent [19]

Ogawa et al.

[11] Patent Number: 5,577,747
[45] Date of Patent: Nov. 26, 1996

[54] BATTERY UNIT COOLING SYSTEM FOR AN ELECTRIC VEHICLE

[75] Inventors: Masao Ogawa; Toru Iwadate, both of Saitama, Japan

[73] Assignee: Honda Giken Kogyo Kabushiki Kaisha, Tokyo, Japan

[21] Appl. No.: 325,943

[22] Filed: Oct. 19, 1994

[30] Foreign Application Priority Data

Oct. 19, 1993 [JP] Japan .................. 5-261336

[51] Int. Cl.⁶ .................................. B60K 11/06
[52] U.S. Cl. .................. 180/220; 180/68.1; 180/68.5
[58] Field of Search .................. 180/220, 219, 180/225, 229, 65.1, 65.3, 68.1, 68.2, 68.5, 903

[56] References Cited

U.S. PATENT DOCUMENTS

| | | | |
|---|---|---|---|
| 3,713,502 | 1/1973 | Delaney et al. | 180/217 X |
| 3,745,048 | 7/1973 | Dinkler et al. | |
| 3,773,131 | 11/1973 | Jaulmes | 180/206 |
| 3,928,080 | 12/1975 | Aronson | 136/160 |
| 4,111,274 | 9/1978 | King et al. | 180/65.5 X |
| 4,183,418 | 1/1980 | Dudas | 180/216 |
| 4,519,473 | 5/1985 | Ochiai et al. | 180/68.1 |
| 4,597,466 | 7/1986 | Yamada | 180/225 |
| 4,666,009 | 5/1987 | Yashima et al. | 180/68.5 |
| 4,678,054 | 7/1987 | Honda et al. | 180/225 |
| 5,012,883 | 5/1991 | Hiramatsu | 180/225 |
| 5,101,924 | 4/1992 | Yamagiwa et al. | 180/220 |
| 5,207,288 | 5/1993 | Ono | 180/68.5 X |
| 5,222,572 | 6/1993 | Yamagiwa et al. | 180/220 |

FOREIGN PATENT DOCUMENTS

| | | |
|---|---|---|
| 327023 | 3/1975 | Austria . |
| 0003888 | 9/1979 | European Pat. Off. . |
| 0050057 | 4/1982 | European Pat. Off. . |
| 408074 | 1/1991 | European Pat. Off. . |
| 469995 | 2/1992 | European Pat. Off. . |
| 0539269 | 4/1993 | European Pat. Off. . |
| 2669585 | 5/1992 | France . |
| 3110365 | 10/1982 | Germany . |
| 2182590 | 7/1990 | Japan ................... 180/220 |
| 3128789 | 5/1991 | Japan . |
| 3243484 | 10/1991 | Japan . |
| 3105098 | 10/1992 | Japan . |
| 5105147 | 4/1993 | Japan . |
| 5105143 | 4/1993 | Japan ................... 180/220 |
| 5112270 | 5/1993 | Japan . |
| 1298046 | 11/1972 | United Kingdom . |
| 2027978 | 2/1980 | United Kingdom . |
| WO84/00642 | 2/1984 | WIPO . |

*Primary Examiner*—Anne Marie Boehler
*Attorney, Agent, or Firm*—Birch, Stewart, Kolasch & Birch, LLP

[57] ABSTRACT

A battery cooling system which cools a plurality of battery units uniformly. The cooling system is provided in an electric vehicle with a longitudinal, hollow main frame provided with a plurality of branching ducts branching from the main frame to distribute cooling air to the battery units, a plurality of battery units arranged along the main frame, and a cooling fan connected to one end of the main frame. The flow passage area of the branch duct at a distal position with respect to an air flow inlet of the cooling air is smaller than those of the other branch ducts.

8 Claims, 15 Drawing Sheets

BATTERY UNIT COOLING SYSTEM FOR AN ELECTRIC VEHICLE

BACKGROUND OF THE INVENTION

1. Field of the Invention

The present invention relates to a battery unit cooling system for uniformly cooling a plurality of battery units mounted on an electric vehicle.

2. Description of the Related Art

The applicant of the present patent application proposed a battery carrying structure previously in Japanese Patent Laid-open (Kokai) No. 5-112270. In this battery carrying structure, a fan sucks fresh air through the interior of a battery case to cool battery units contained in the battery case.

Since the battery case is formed in an airtight construction to protect the battery units from mud and water, and the battery units generate heat when the batteries are charged, the interior of the battery case needs forced cooling.

In this battery carrying structure, the battery units nearer to the fan and those farther from the fan are cooled in different degrees, and the battery carrying structure is unable to cool the plurality of battery units uniformly.

SUMMARY AND OBJECTS OF THE INVENTION

It is an object of the present invention to provide a battery unit cooling system capable of uniformly cooling battery units.

With the foregoing object in view, the present invention provides a battery unit cooling system for an electric vehicle, comprising: a longitudinal, hollow frame included in the electric vehicle; a plurality of branch ducts branching from the frame and connected respectively to a plurality of battery units arranged along the frame; and a cooling fan connected to one end of the frame to cool the plurality of battery units blowing air through the hollow frame and branch ducts into the battery units or sucking air through the battery units into the hollow frame; wherein a flow passage area of a branch duct furthest from said one end of the frame is smaller than those of the other branch ducts.

Preferably, the frame is the longitudinal main frame of the electric vehicle.

The flow passage areas of the branch ducts at lower positions with respect to the direction of flow of air may be smaller than those of the branch ducts at upper positions with respect to the direction of flow of air.

The branch duct farthest from the cooling fan has a flow passage area smaller than those of the other branch ducts to equalize the flow rates of air in all of the branch ducts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A battery unit cooling system in a preferred embodiment according to the present invention will be described hereinafter with reference to the accompanying drawings.

Figure 1:
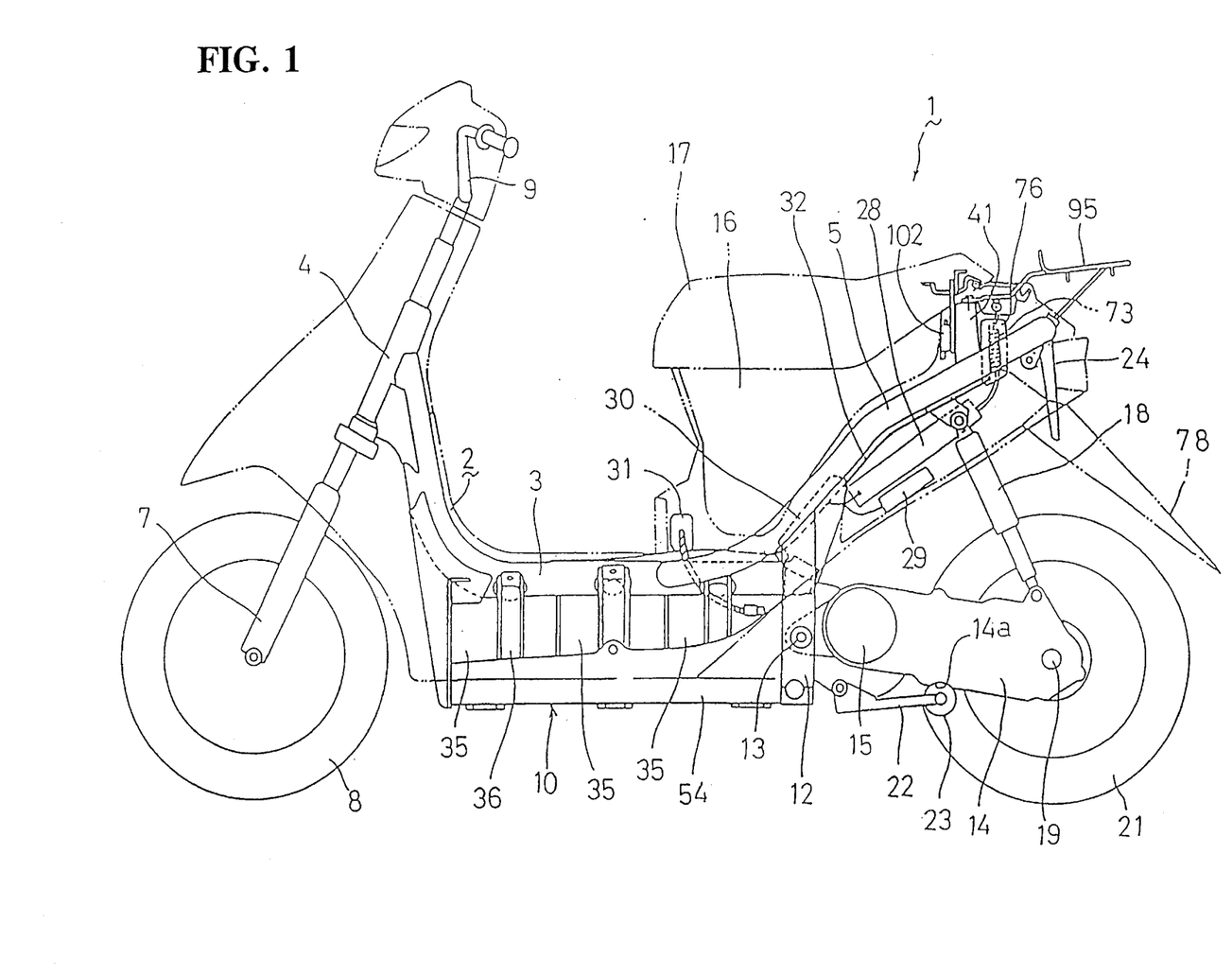
FIG. 1 is a side view of an electric vehicle incorporating a battery unit cooling system in accordance with the present invention.

FIG. 1 is a side view of an electric vehicle incorporating a battery unit cooling system of the present invention. An electric vehicle 1, which is an electric motorcycle, comprises a chassis frame 2 having a main frame 3, a head pipe 4 attached to the front end of the main frame 3, and a rear frame 5 extending obliquely upward from the rear end of the main frame 3. A front fork 7 is supported on the head pipe 4. A front wheel 8 is supported on the lower end of the front fork 7. A handlebar 9 is attached to the upper end of the front fork 7.

A battery case 10 is suspended from the main frame 3. A swing power unit 14, including a driving motor 15, is pivotally joined at its front end to the rear end of the main frame 3 with a pivot shaft 13. A storage box 16 is mounted on the rear frame 5. A seat 17 is mounted on the rear frame 5 above the storage box 16. A rear shock absorber 18 is pivotally joined at an upper end to the rear frame 5 and is pivotally joined at a lower end to the rear end of the swing power unit 14. A rear wheel 21 is supported on a rear axle 19 disposed on the rear end of the swing power unit 14.

Electric parts including a battery charger are arranged along the rear frame 5. The chassis frame 2 is covered entirely with a cowling and fenders, which will be hereinafter described. A seat locking mechanism serving also as a locking mechanism for locking a lid covering the mouth of a plug container is disposed behind the seat 17, which will be hereinafter described.

In FIG. 1, a side stand 22 is shown. A roller 23 is disposed on the end of the side stand 22. A recess 14a receives the roller 23 therein. A license plate holder 24 is also provided.

Figure 2:
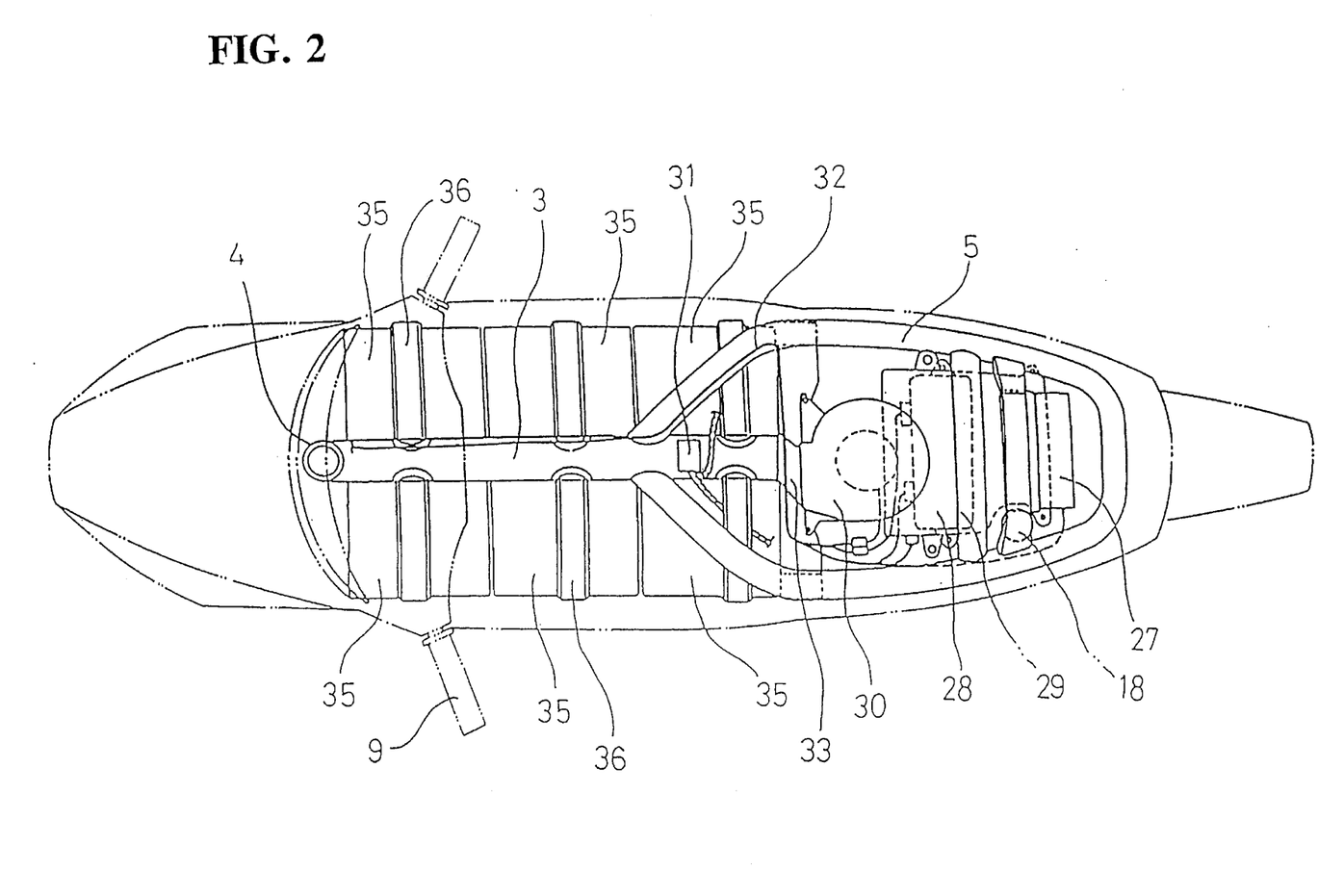
FIG. 2 is a plan view of a chassis frame and the associated parts included in the electric vehicle of FIG. 1.

FIG. 2 is a plan view of the chassis frame of the electric vehicle incorporating the battery unit cooling system of the present invention. The rear frame 5 has a substantially oval shape in a plan view. A down regulator 27, a charging controller 28 for controlling battery charging operation, a motor controller 29 for controlling the driving motor and the associated parts for traveling, a battery cooling fan 30, and a fuse box 31 are arranged in that order on the rear frame 5 from the rear side toward the front side of the vehicle. The electric components are connected to a wiring harness 32.

The main frame 3 is a hollow pipe capable of serving as a main duct. One end of the main frame 3 is connected to a discharge duct 33 which is connected to the battery cooling fan 30. The construction of the main frame 3 serving also as a main duct will be hereinafter described.

In this embodiment, six battery units 35 are held on the main frame 3. Three battery units 35 are arranged longitudinally on the right-hand side of the main frame 3 and three battery units 35 are arranged longitudinally on the left-hand side of the main frame 3. The battery units 35 are held in place with battery fastening bands 36.

Figure 3:
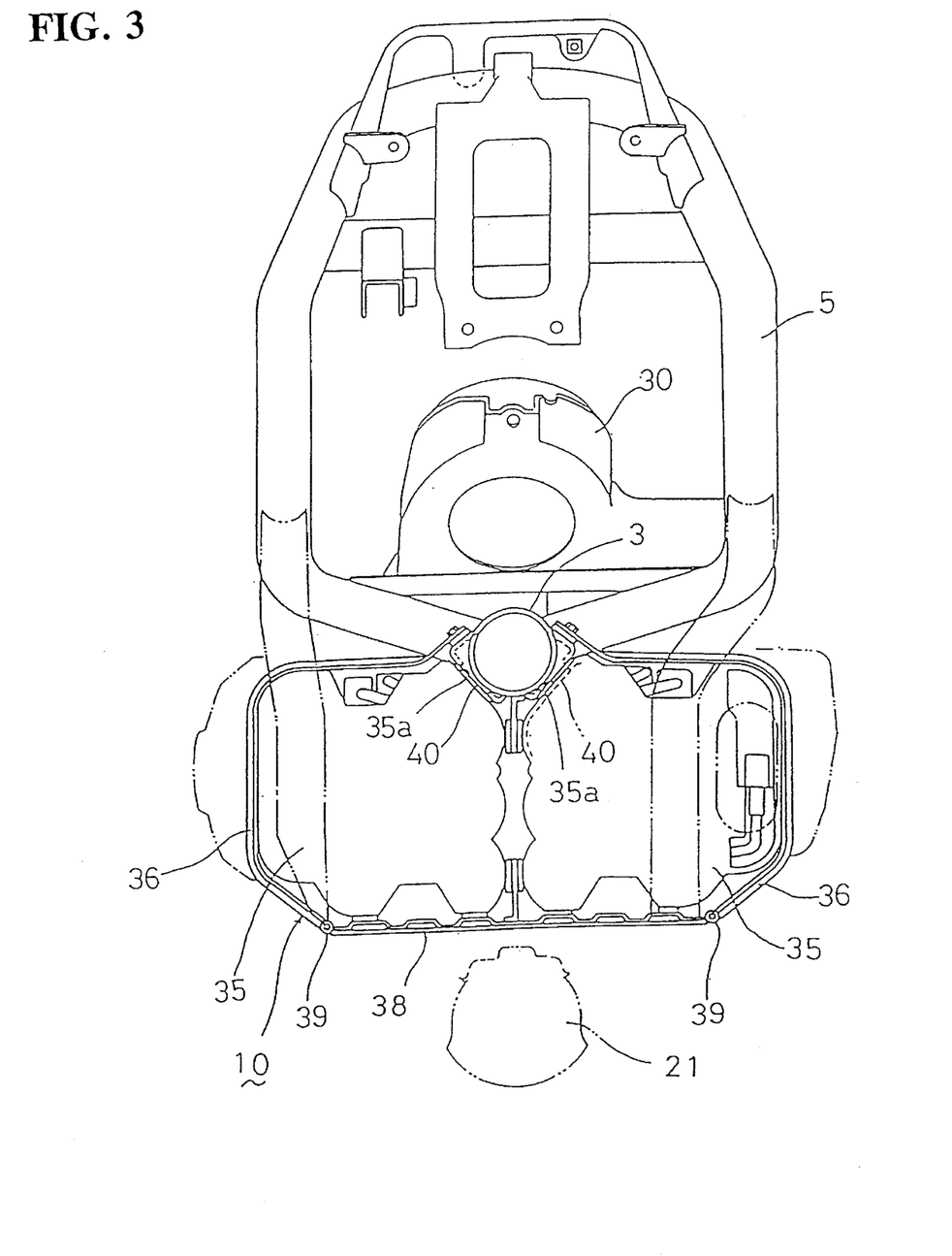
FIG. 3 is a cross-sectional view of the body of the electric vehicle of FIG. 1.

FIG. 3 is a cross-sectional view of the chassis frame taken in the substantially middle portion of the chassis frame. The bottom plate 38 of the battery case 10 is disposed under the main frame 3, the battery units 35 are mounted on the bottom plate 38. Each battery unit 35 has an air inlet connected to a branch duct 40 branching from the main frame 3. The bottom plate 38 is formed by a corrugated plate and has a comparatively high rigidity. The lower ends of the battery fastening bands 36 are joined to knuckles 39 formed on the right and left side of the bottom plate 38.

Figure 4:
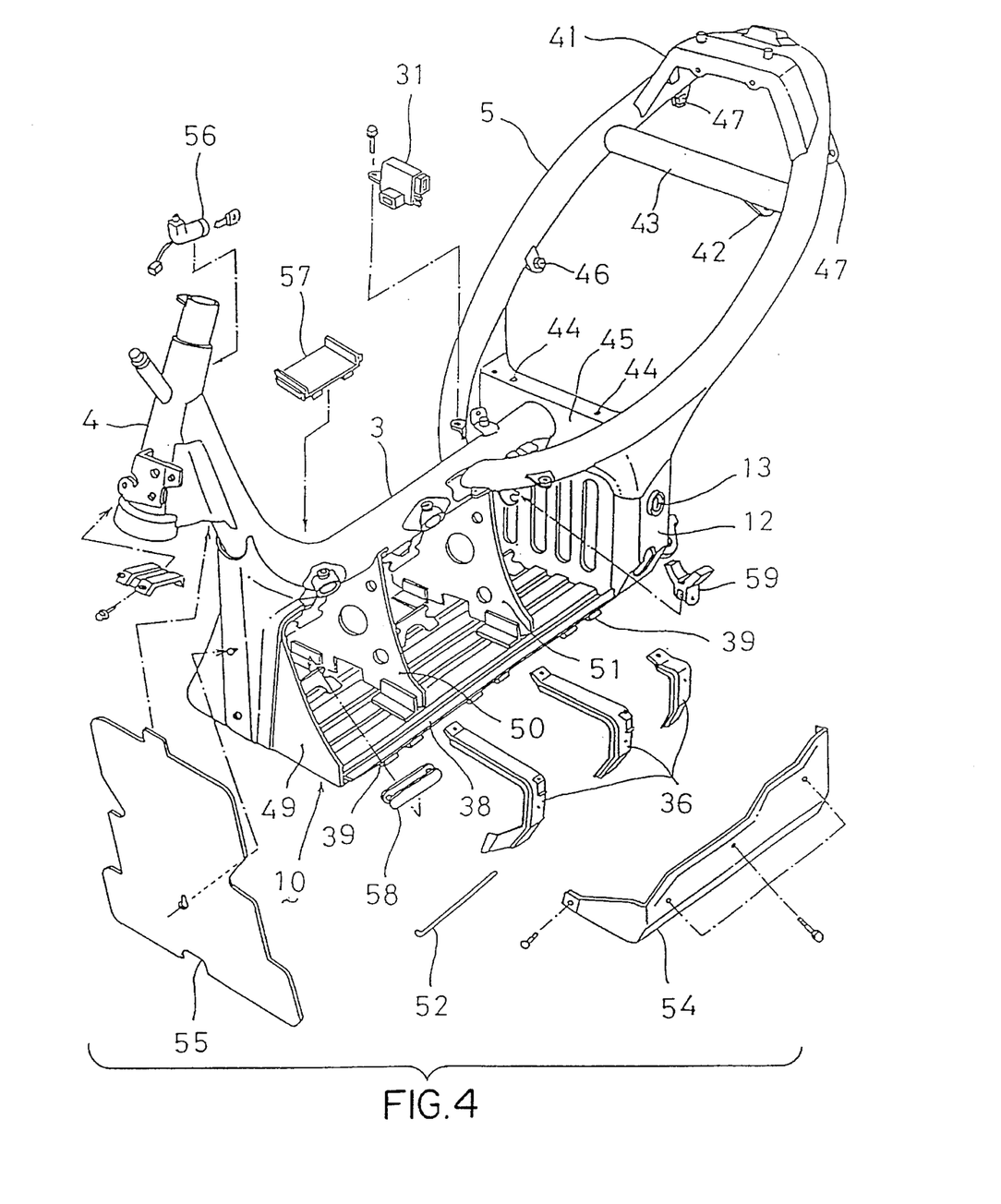
FIG. 4 is an exploded perspective view of a chassis frame, a battery case and the associated parts included in the electric vehicle of FIG. 1.

FIG. 4 is an exploded perspective view of the chassis frame, the battery case and the components of the electric vehicle 1. A bridge bracket 41, a cross pipe 43 provided with a bracket 42 to which the upper end of the rear shock absorber 18 is joined pivotally, and a cross panel 45 provided with holes 44 for receiving screws for fastening the battery cooling fan are extended across and attached to the oval rear frame 5. The cross panel 45 also extends between brackets 12 for supporting the pivot shaft 13.

Lugs 46 and 47 are provided for supporting the charging controller 28 and the motor controller 29.

Substantially triangular brackets 49, 50 and 51 are suspended from the main frame 3, and the lower sides of the brackets 49, 50 and 51 are joined to the bottom plate 38. A long hinge pin 52 is inserted in the knuckles 39 formed on each side of the bottom plate 38 and the knuckles formed at the lower ends of the battery fastening bands 36 to join the battery fastening bands 36 pivotally to the bottom plate 38.

Lower side covers 54 are attached to the opposite sides of the battery case 10, and a front cover 55 is attached to the front end of the battery case 10. In FIG. 4, a main switch 56, including an ignition switch, is provided. Battery support plates 57, and cushion members 58 and 59 are provided for preventing the lateral dislocation of the battery units 35.

Figure 5:
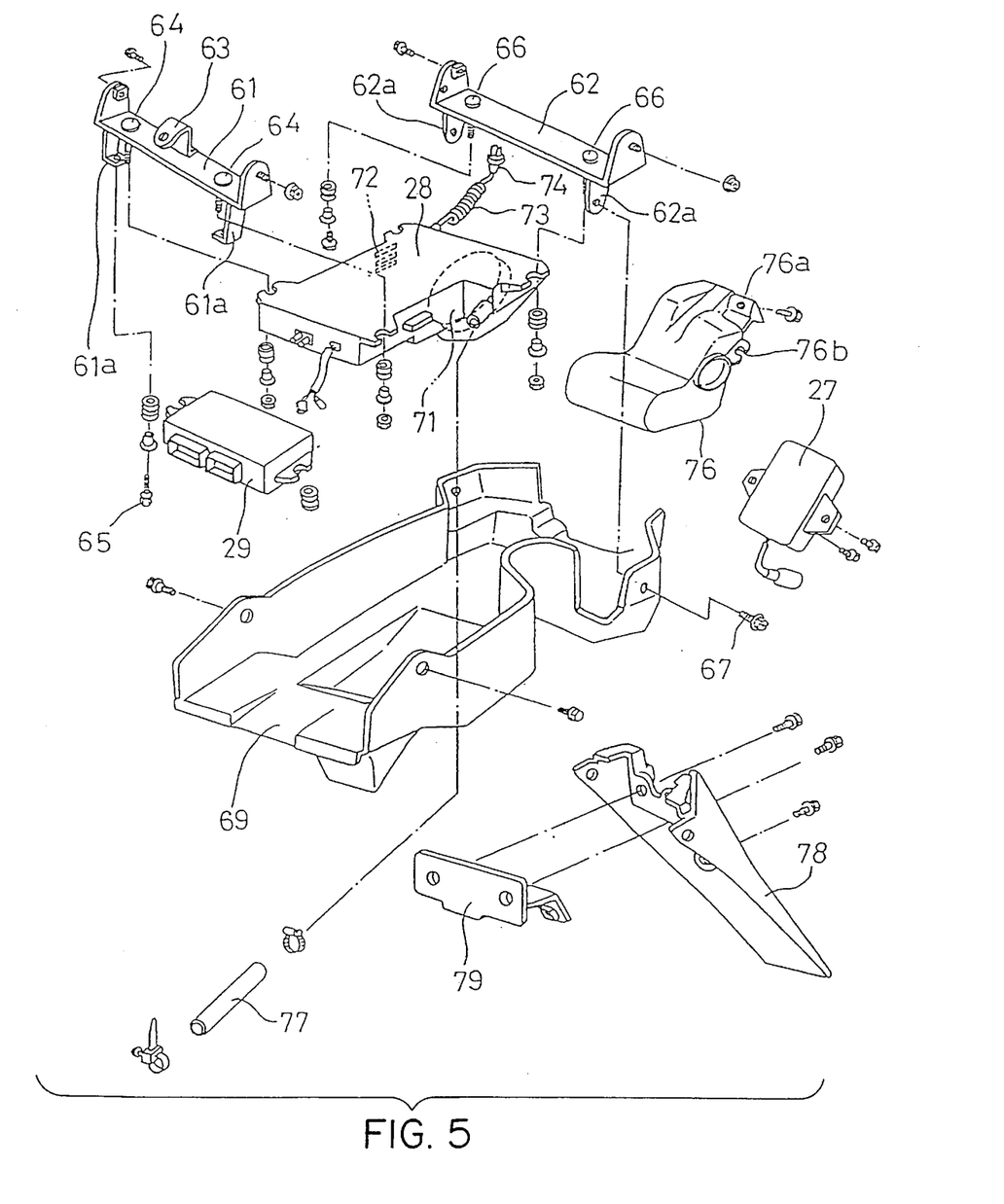
FIG. 5 is an exploded perspective view of controllers, a rear fender and other parts included in the electric vehicle of FIG. 1.

FIG. 5 is an exploded perspective view of a portion of the electric vehicle 1 around the controllers 28,29 and the rear fender 69. A front controller support plate 61 is fastened to the lugs 46 (FIG. 4) with bolts, and a rear controller support plate 62 is fastened to the lugs 47 (FIG. 4) with bolts.

The front controller support plate 61 is provided on its upper surface with a bracket 63 to which the battery cooling fan is attached. The front end of the charging controller 28 is fastened to the front controller support plate 61 with bolts 64. The front controller support plate 61 is provided with legs 61a at its opposite ends, and the motor controller 29 is fastened to the extremities of the legs 61a with bolts 65.

The rear end of the charging controller 28 is fastened to the rear controller support plate 62 with bolts 66. The rear controller support plate 62 is provided with legs 62a at its opposite ends, and the rear end of the rear fender 69 is fastened to the legs 62a with bolts 67. The rear fender 69 extends over a rear wheel 21, not shown in FIG. 5, and serves also as a box for containing the charging controller 28, the motor controller 29 and the associated parts.

The internal components of the charging controller 28 generate heat during battery charging operation. Therefore, the charging controller 28 must be cooled by forced cooling. The charging controller 28 is provided with a charger cooling fan 71 and a suction hole 72 is formed in the side wall of the charging controller 28 for forced cooling.

A charging cable 73 provided with a plug 74 is stored in a charging cable box 76 formed of a resin by blow molding and provided with lugs 76a and 76b which are fastened to the chassis frame 2.

Heat generated within the battery charger is discharged through a discharge hose 77 shown in the lower left-hand corner of FIG. 5. A rear mud guard 78 is attached to a bracket 79.

Figure 6:
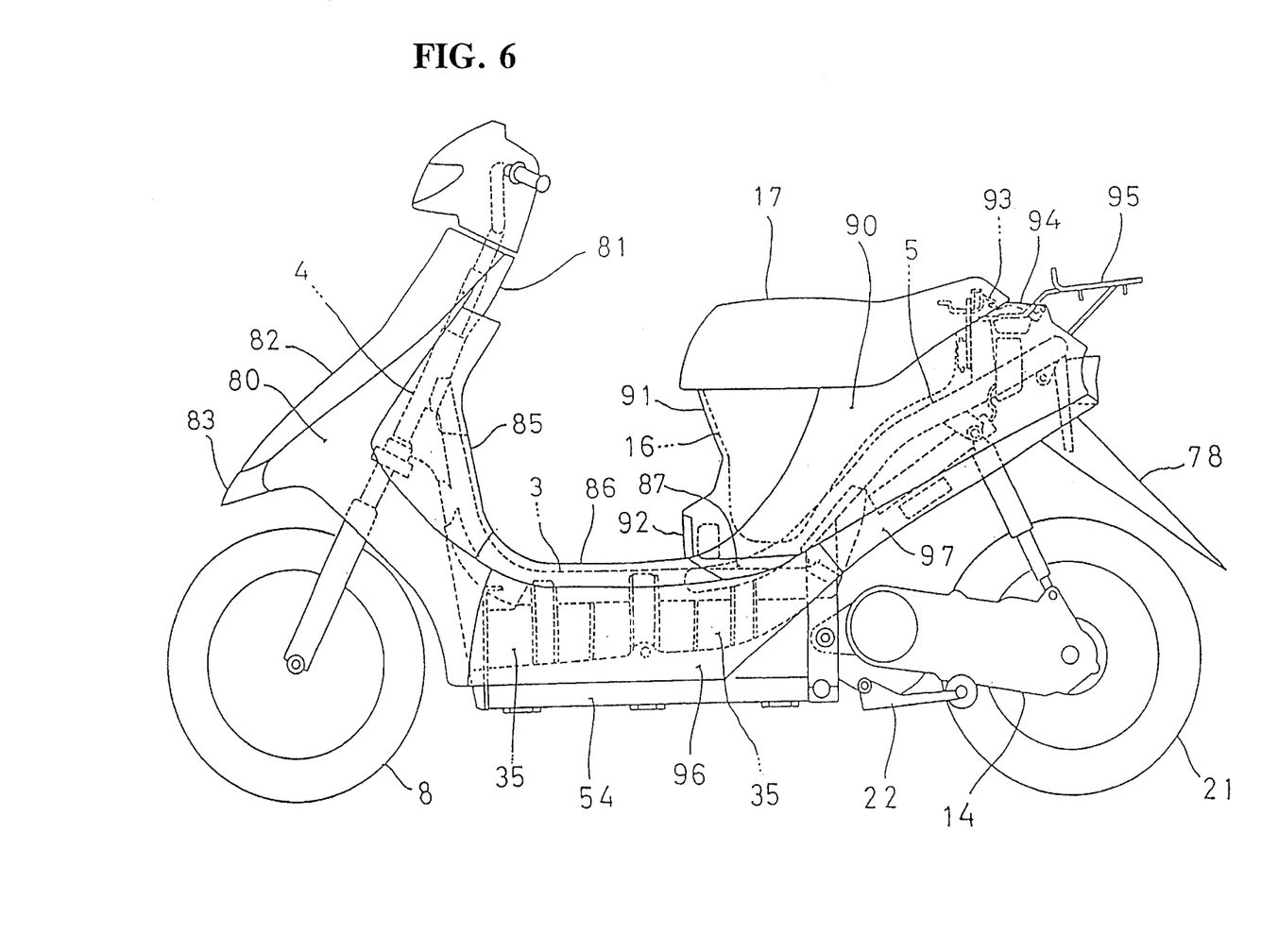
FIG. 6 is a side view of the electric vehicle of FIG. 1 as equipped with fenders and covers.
Figure 7:
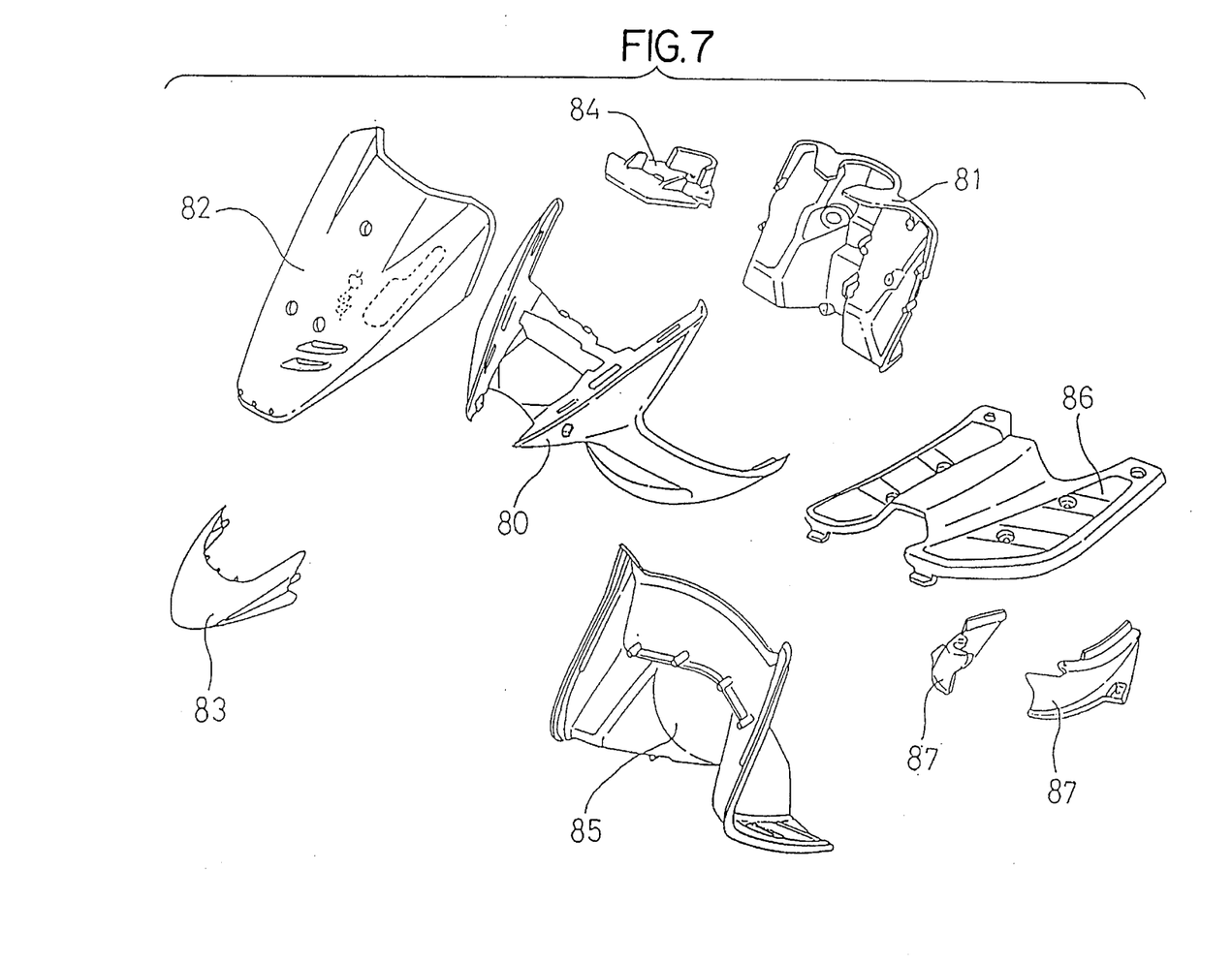
FIG. 7 is an exploded perspective view of fenders and covers for covering the front portion of the electric vehicle of FIG. 1.

FIG. 6 is a side view of the electric vehicle equipped with fenders and covers. FIG. 7 is an exploded perspective view of fenders and covers for covering the front portion of the chassis frame, and FIG. 8 is an exploded perspective view of fenders and covers covering the rear portion of the chassis frame.

Shown in FIG. 7 are a front fender 80, a front inner upper cover 81, a front upper cover 82 joined to the upper end of the front fender 80, a front mud guard 83 joined to the lower end of the front fender 80, a handlebar cover 84, a front inner upper cover 85, a step board 86, and side floors 87. These covering members are assembled so as to cover the main frame 3 and the head pipe 4 as shown in FIG. 6.

Figure 8:
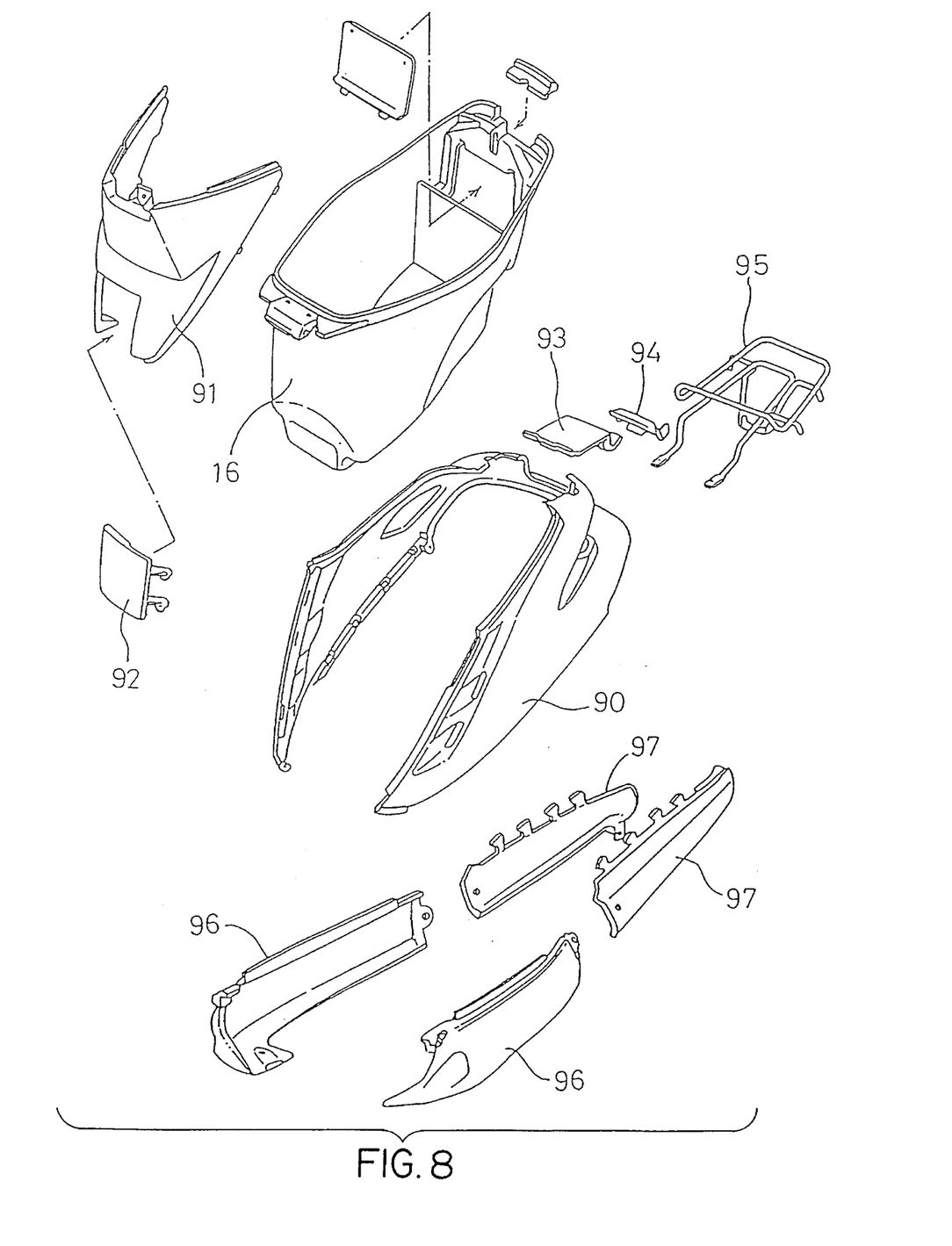
FIG. 8 is an exploded perspective view of fenders and covers for covering the rear portion of the electric vehicle of FIG. 1.

Referring to FIG. 8, the storage box 16 is surrounded by a main cover 90 and a central cover 91. Shown in FIG. 8 are a fuse box lid 92 disposed on the center cover 91 to close a fuse box so as to be removed from the center cover 91 when changing fuses. A first lid 93 and a second lid 94 cover a charging cable box. A rack 95 is attached to the main cover 90. Side covers 96 are suspended from the step board 86 so as to cover the lower side openings of the battery case 10, and side covers 97 are joined to the rear part of the lower edge of the main cover 90. These covering members are assembled so as to cover the main frame 3 and the rear frame 5 as shown in FIG. 6.

Parts indicated by broken lines in FIG. 6 are those previously described with reference to FIG. 1 and hence the description thereof will be omitted.

Figure 9:
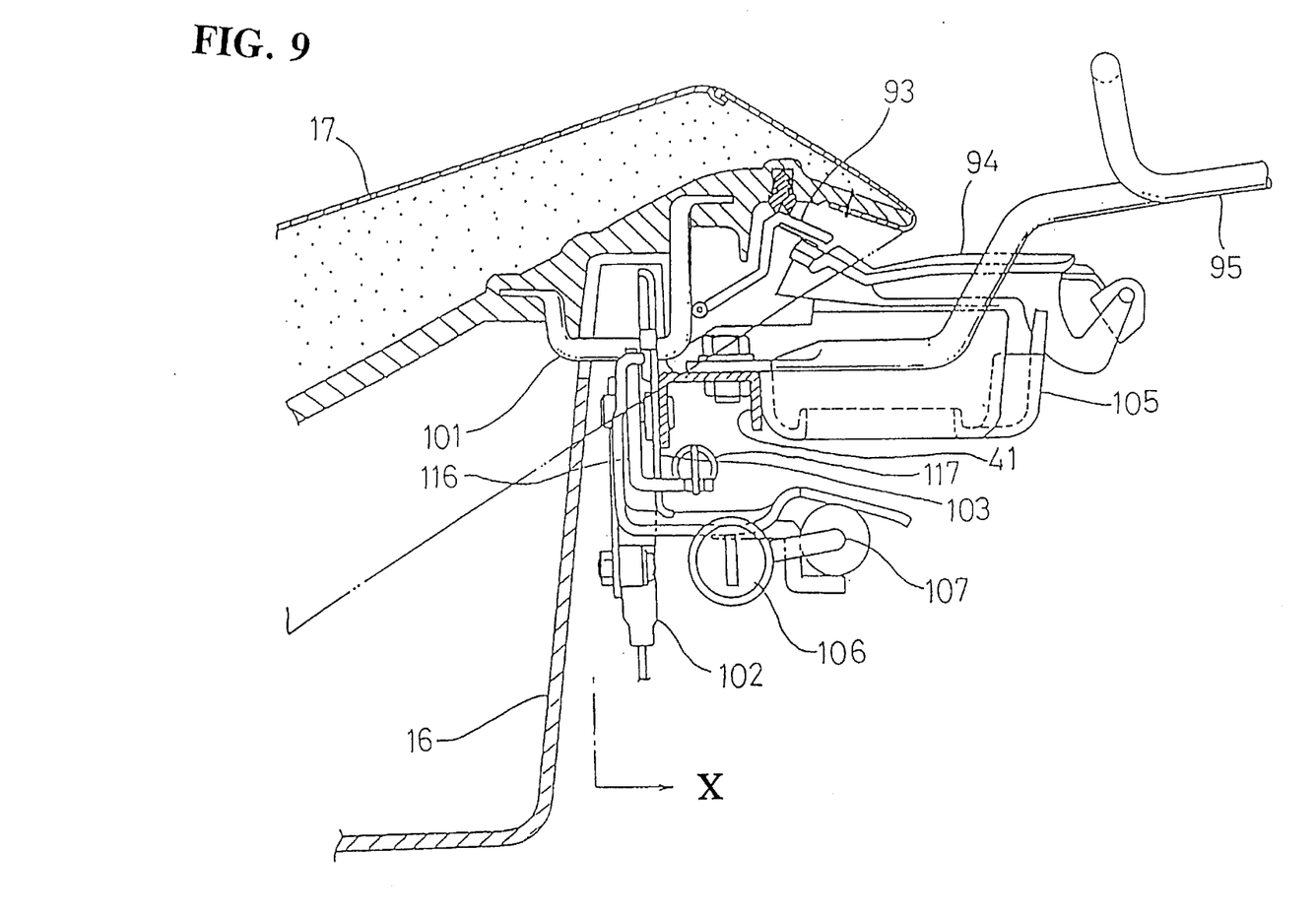
FIG. 9 is an enlarged view of the components of the electric vehicle of FIG. 1, arranged behind the seat (a locking mechanism for locking the seat and a lid covering a plug container)

FIG. 9 is an enlarged side view of the components of a seat locking mechanism serving also as a lid locking mechanism for locking a lid covering the charging cable box arranged behind the seat of the electric vehicle incorporating the battery cooling system of the present invention. A bent locking bar (or a bent locking pipe) 101 is attached to the rear part of the lower surface of the seat 17 covering the upper open end of the storage box 16. A seat switch 102 is disposed under the locking bar 101 and is attached to a switch support plate 103 fastened to the bridge bracket 41 with bolts.

The switch support plate 103 will be hereinafter described in detail.

The cable box is covered with a first lid 93 and a second lid 94. When taking out the charging cable 73 (FIG. 1) from the cable box, first the seat 17 is raised, the first lid 93 is opened, and then the second lid 94 is opened. The plug 74 connected to the charging cable 73 is held by a plug holder 105.

A locking lever 107 is connected to a key cylinder 106. When the key cylinder 106 is turned so as to turn the locking lever 107 upward, the seat 17 is released.

Figure 10:
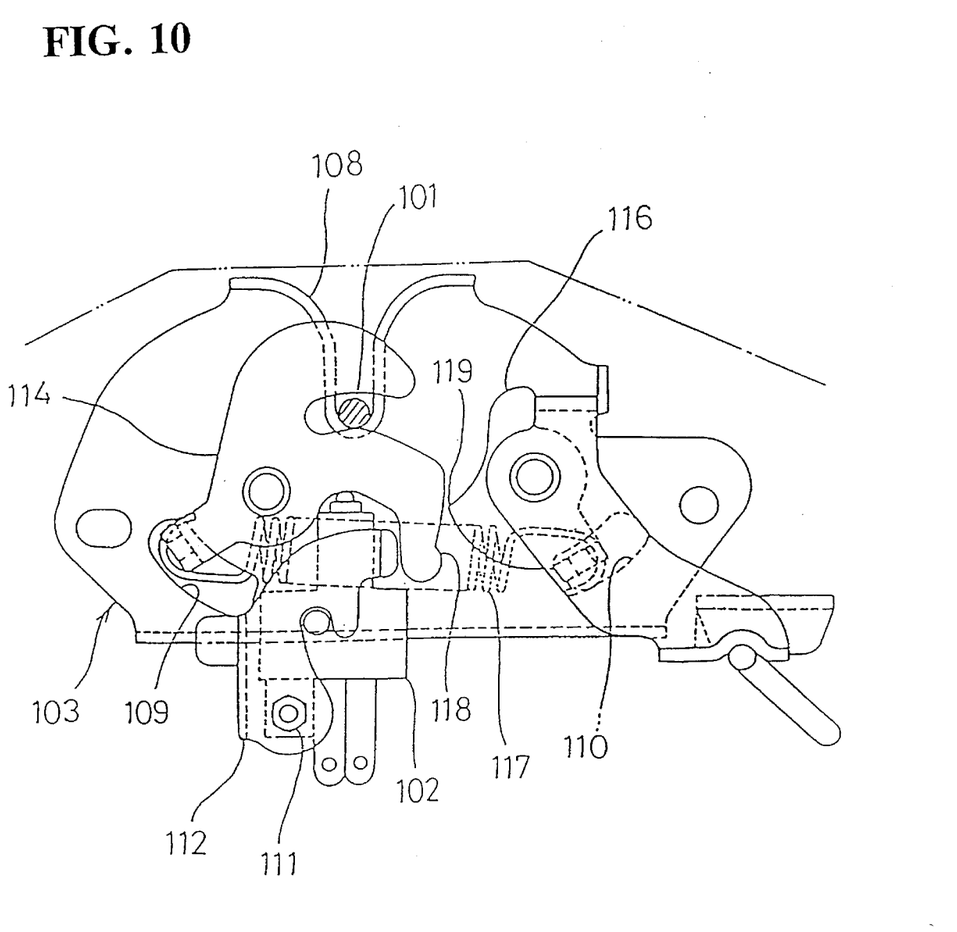
FIG. 10 is a view taken in the direction of the arrow X in FIG. 9.

FIG. 10 is a view taken in the direction of the arrow in FIG. 9. Referring to FIG. 10, the switch support plate 103 is provided with a guide groove 108 for guiding the locking bar 101 in its upper portion, and two slots 109 and 110 having the shape of an arc of a circle formed respectively near the opposite ends of its lower portion.

The seat switch 102 is fastened to a small bracket 112 with a bolt 111, and the small bracket 112 is welded to the front surface of the switch support plate 103 so that the seat switch 102 is disposed in the center of the lower portion of the switch support plate 103.

A first swing plate 114, which is turned downward to actuate the seat switch 102 when the locking bar 101 is lowered, is supported pivotally on the switch support plate 103. A second swing plate 116 is supported pivotally on the switch support plate 103.

The first swing plate 114 is biased counterclockwise with a spring 117, and the second swing plate 116 is biased clockwise by the spring 117.

When the passenger leaves the seat 17, the first swing plate 114 is turned slightly counterclockwise from the position shown in FIG. 10 by the spring 117, during this rotation the arm 118 comes into contact with a cam 119 formed on the second swing plate 116.

Since the second swing plate 116 is stationary, the first swing plate 114 is unable to turn further counterclockwise and, consequently, the locking bar 101 is restrained from further upward movement by the first swing plate 114 and hence the seat 17 is locked in place and cannot be turned upward.

The state shown in FIG. 10 is established with the first swing plate 114 depressing the seat switch 102 when the passenger sits on the seat 17. The first swing plate 14 is turned slightly counterclockwise from the position shown in FIG. 10 by the spring 117 and is separated from the seat switch 102 when the passenger is not seated on the seat 17. Thus, it is possible to detect electrically whether or not the passenger is seated on the seat 17, while the seat 17 is locked in place.

The seat 17 is raised according to the following procedure.

The key cylinder 106 (FIG. 9) is turned to raise the locking lever 107 upward. Consequently, the second swing plate 116 (FIG. 10) is turned counterclockwise and the cam 119 of the second swing plate 116 moves below the arm 118 of the first swing plate 114 to release the arm 118. Then, the first swing plate 114 is turned counterclockwise through a large angle by the spring 117 to enable the locking bar 101 to move upward, so that the seat 17 can be raised by hand.

Figure 11:
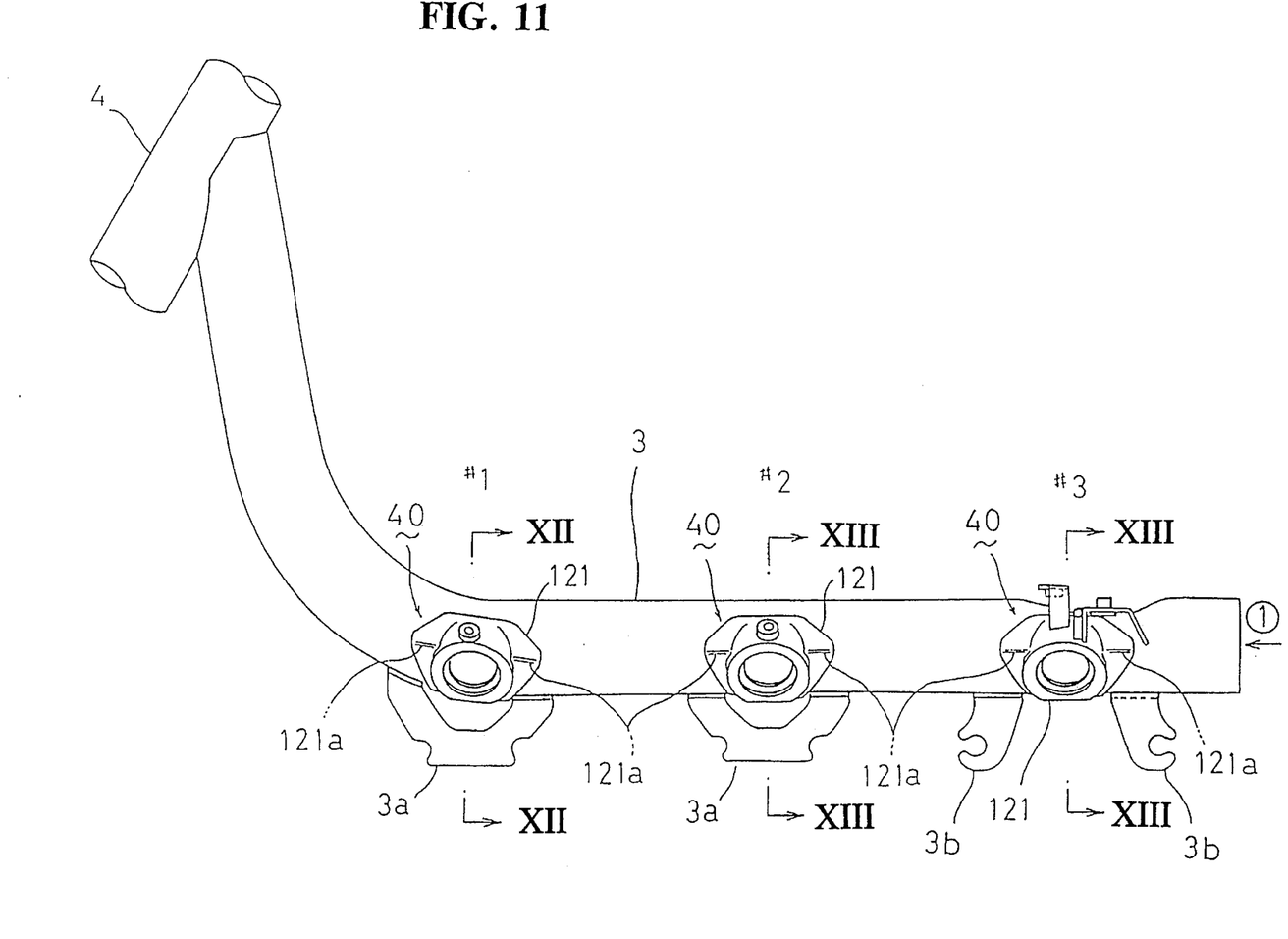
FIG. 11 is a side view of a main frame included in the electric vehicle of FIG. 1, employed in the present invention.

FIG. 11 is a side view of the main frame 3 capable of serving as a main duct. Three branch ducts 40 are connected to the right side of the main frame 3 at positions #1, #2 and #3, and three branch ducts 40 are connected to the left side of the main frame 3 at the positions #1, #2 and #3. The branching fixture 121 of each branch duct 40 is provided with drain grooves 121a so that paint will not stay within the branching fixture 121 in a painting process to be carried out after welding the branching fixtures 121 to the main frame 3.

Figure 12:
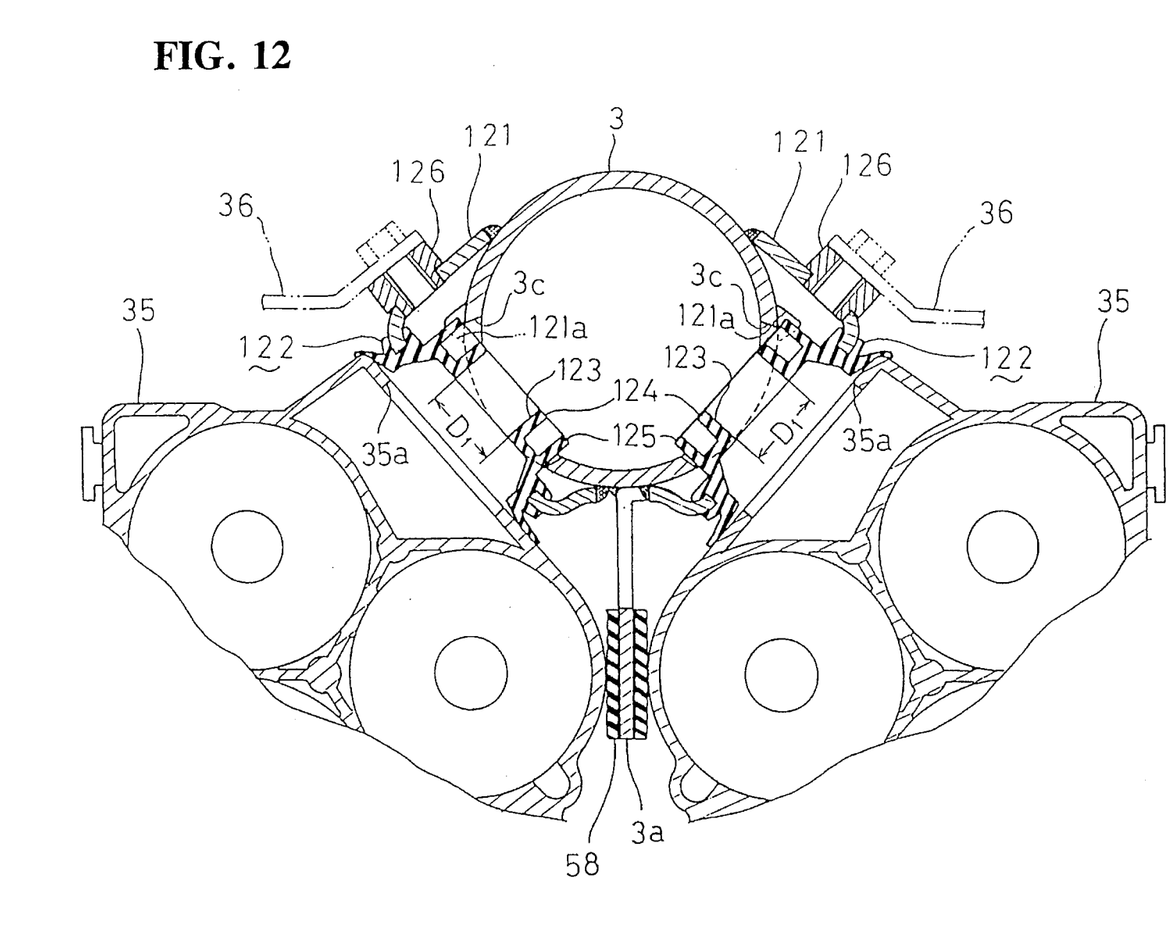
FIG. 12 is a sectional view taken on line XII—XII in FIG. 11 showing first sealing members and battery units.

In FIG. 11, partition plates 3a and 3b project downward from the main frame 3 to separate the battery units 35 arranged on the right side of the electric vehicle and the battery units 35 arranged on the left side of the vehicle from each other as shown in FIG. 12.

FIG. 12 is a sectional view taken on line XII—XII in FIG. 11. Referring to FIG. 12, a first sealing member 122 is attached to each of the branching fixtures 121 at the position #1. The sealing member 122 has an inner cylindrical wall 124 defining an orifice 123 having a diameter $D_1$, and an outer cylindrical wall 125 concentric with the inner cylindrical wall 124 and closely fitted in an opening 3c formed in the main frame 3. The bell mouth of the first sealing member 122 is pressed firmly against the battery unit 35 so as to surround an air inlet 35a formed in the battery unit 35. The sealing member 122 is preferably formed from an elastic material.

Since the inner cylindrical wall 124 and the outer cylindrical wall 125 of the first sealing member 122 are separated by an annular space, the diameter $D_1$ of the orifice 123 defined by the inner cylindrical wall 124 remains unchanged even if the outer cylindrical wall 125 is deformed elastically.

Although the branching fixture 121 is provided with the drain grooves 121a, the drain grooves 121a are closed by the outer cylindrical wall 125 of the sealing member 122 as shown in FIG. 12, so that air is unable to flow outside from the main frame 3 through the drain grooves 121a.

As shown in FIG. 12, the free end of each battery fastening band 36 indicated by alternate long and two short dashes lines is fixed to the branching fixture 121 with a bolt screwed in a nut 126 fixed to the branching fixture 121, and the lower edges of the partition plates 3a separating the battery units 35 are sandwiched by cushion members 58.

Figure 13:
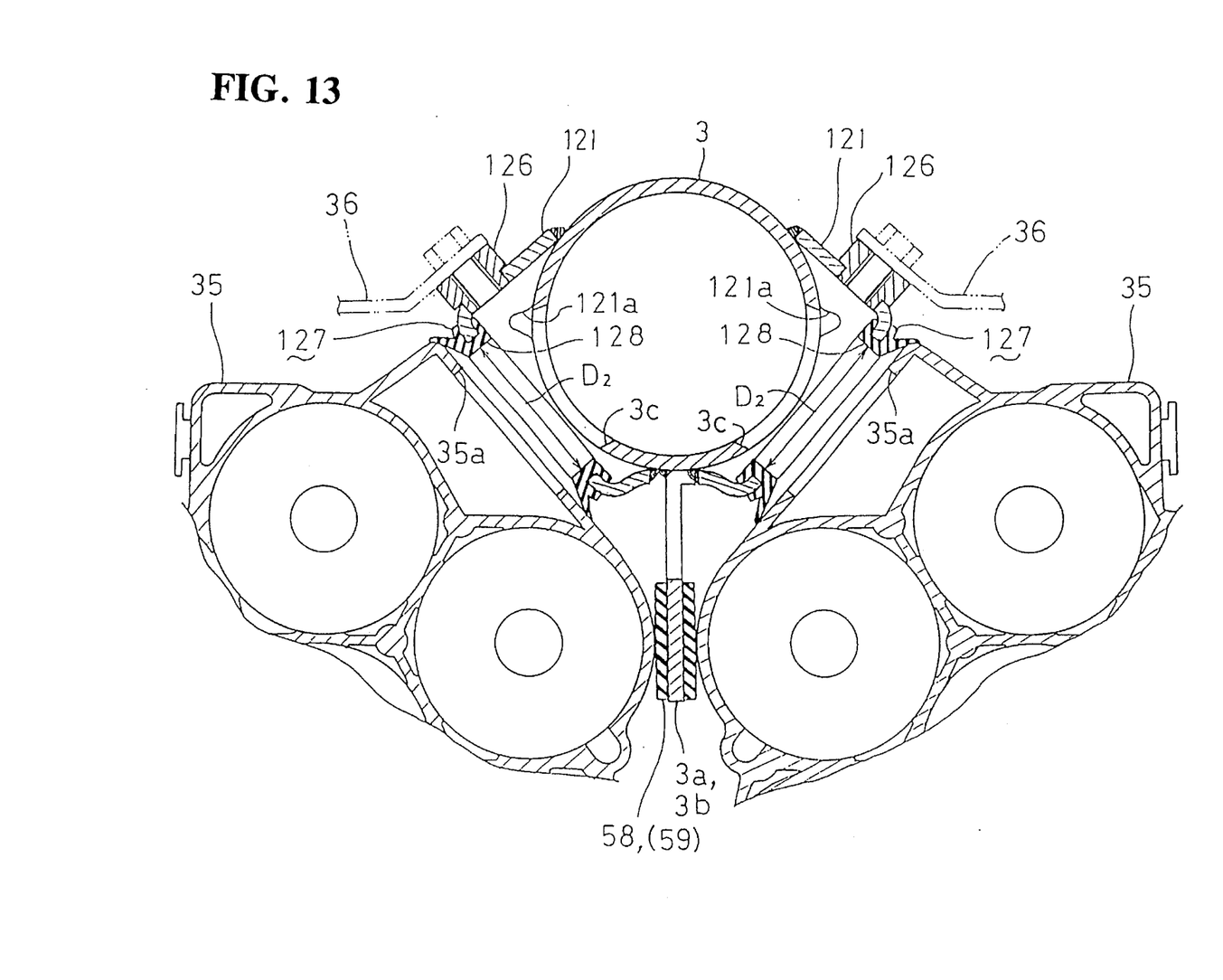
FIG. 13 is a sectional view taken on line XIII—XIII in FIG. 11, showing second sealing members and battery units.

FIG. 13 is a sectional view taken on line XIII—XIII in FIG. 11. Referring to FIG. 13, a second sealing member 127 is attached to each of the branching fixtures 121 at the position #2 or #3. The bell mouth of the second sealing member 127 is pressed firmly against the battery unit 35 so as to surround the air inlet 35a. Each second sealing member 127 has an orifice 128 having a diameter $D_2$.

Part of air supplied through the main frame 3 leaks outside through the drain grooves 121a and the rest flows through the orifice 128 having the diameter $D_2$ into the battery unit 35.

The function of the structure shown in FIGS. 11 to 13 will be described hereinafter.

Cooling air blown by the battery cooling fan 30 (FIG. 1) flows through the main frame 3 in the direction of the arrow (1) (shown in FIG. 11) and flows out of the main frame 3 through the branching fixtures 121.

Fundamentally, the cooling air flows through the branching fixtures 121 because the front end of the main frame 3 is closed by the head pipe 4.

The flow rate of the cooling air flowing through each of the branching fixtures 121 at the position #1, i.e., the lowermost position with respect to the direction of flow of the cooling air, is greater than those of the cooling air flowing through each of the branching fixtures 121 at the positions #2 and #3, because the flow of the cooling air is stopped by the head pipe 4. Similarly, the flow rate of the cooling air flowing through each of the branching fixtures 121 at the position #2 is slightly higher than that of the cooling air flowing through each of the branching fixtures 121 at the position #3.

As shown in FIG. 12, the orifice 123 of the first sealing member 122 determines the flow rate $Q_1$ of the cooling air that flows through the first sealing member 122.

The diameter of the orifice of the second sealing member 127 shown in FIG. 13 is greater than that of the first sealing member 122. Therefore, the cooling air flows through the second sealing member 127 more easily than it flows through the first sealing member 122. Supposing that the cooling air flows at a flow rate $Q_3$ through the opening 3c of the main frame 3, and at $Q_4$ through the drain grooves 121a of the branching fixture 121, the cooling air flows through the orifice 128 at a flow rate $Q_2=Q_3-Q_4$. The respective diameters $D_1$ and $D_2$ of the orifices 123 and 128 are determined so that the flow rate $Q_2$ is approximately equal to the flow rate $Q_1$.

Figure 14:
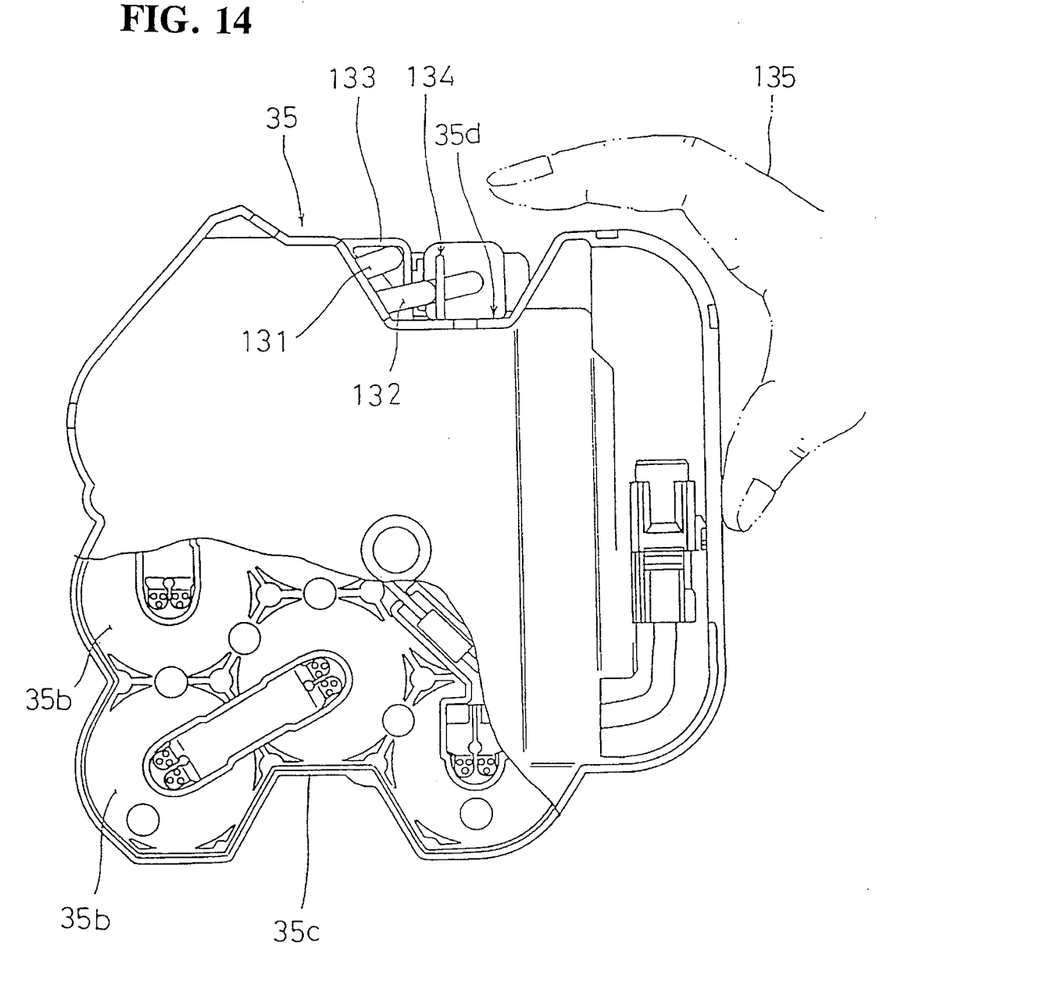
FIG. 14 is a front view of a battery unit according to the principles of the present invention.

FIG. 14 is a front view of the battery unit 35 to be used on the electric vehicle incorporating the battery cooling system of the present invention. The battery unit 35 comprises a plurality of batteries 35b, and a battery container 35c containing the batteries 35b. A groove 35d is formed in the upper wall of the battery container 35c, and cables 131 and 132 connected respectively to the positive terminal and the negative terminal of the battery container 35c are extended in the groove 35d.

Figure 15:
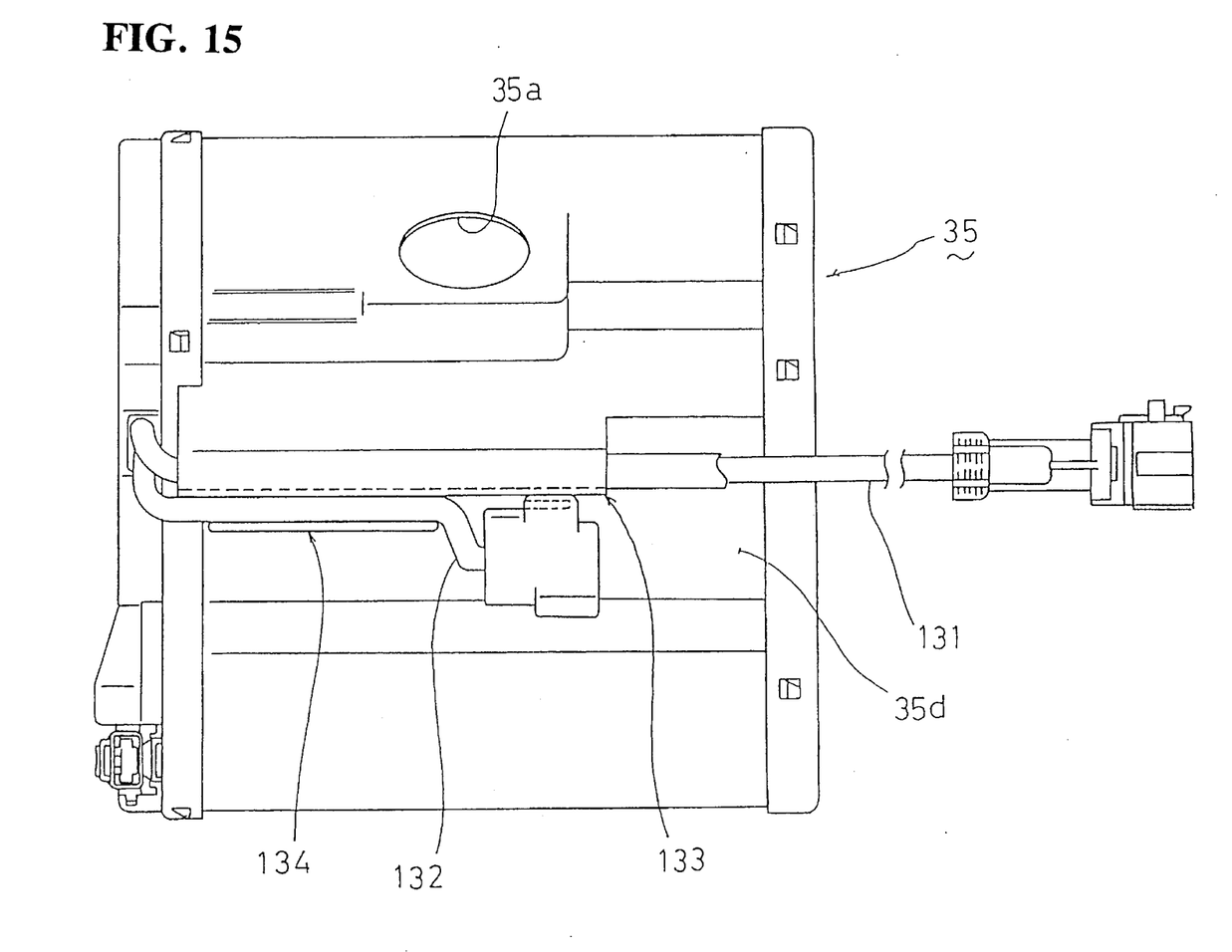
FIG. 15 is a plan view of a battery unit according to the principles of the present invention.

FIG. 15 is a plan view of the battery unit 35. The longer cable 131 is extended under a cover 133 having an L-shaped cross section, and the shorter cable 132 is extended outside the cover 133 and along a guide rib 134.

The battery unit 35 is mounted on the electric vehicle with the left side thereof, as viewed in FIG. 14, on the side of the main frame. When mounting the battery unit 35 on the electric vehicle, the hand 135 is put on the battery unit 35 as indicated by imaginary lines in FIG. 14. Since the cables 131 and 132 do not move toward the hand 135, the battery unit 35 can easily be mounted on the electric vehicle. If the battery unit 35 is not provided with the guide rib 134, the cable 132 may droop and obstruct the mounting of the battery unit 36.

In the battery cooling system of the present invention shown in FIG. 11, the respective diameters of the orifices of the sealing members at the positions #2 and #3 are equal to each other. However, the diameters of the orifices need not necessarily be equal to each other. The diameter of the orifice of the sealing member at the position #2 may be smaller than that of the orifice of the sealing member at the position #3, that is, the respective diameters of the orifices of the sealing members at the positions #1, #2 and #3 may be increased in that order, namely, the diameters of the orifices of the upper sealing members with respect to the direction of flow of the cooling air may be greater than those of the orifices of the lower sealing members.

Although the orifices 123 and 128 are formed in the sealing members 122 and 127, respectively, in this embodiment, the orifices 123 and 128 may be formed in the branching fixtures 121 or in the accessories of the branching fixtures 121, or plates each provided with an orifice may be inserted in the branching fixtures 121.

The electric vehicle 1 that incorporates the battery cooling system of the present invention may be a motorcycle, a motor three-wheeler or a four-wheel vehicle, provided that the electric vehicle has a frame corresponding to the main frame.

Furthermore, any frame other than the main frame may be used as the main duct, provided that the frame is hollow.

Still further, the battery units may be cooled in either a force-draft mode or an induced-draft mode.

As is apparent from the foregoing description, according to the present invention, the flow passage area of the lowest branching duct with respect to the direction of flow of cooling air is smaller than those of the other branching ducts to equalize the flow rates of cooling air flowing through the branching ducts, so that the plurality of battery units can uniformly be cooled and the plurality of battery units are able to exhibit their expected performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric vehicle having a battery unit cooling system, comprising:

a longitudinal, hollow frame included in the electric vehicle;

a plurality of branch ducts branching from the frame and connected respectively to a plurality of battery units arranged along the frame; and a cooling fan connected to one end of the frame to cool the plurality of battery units in a forced-draft mode;

wherein a flow passage area of a branch duct furthest from said one end of the frame is smaller than those of the other branch ducts.

2. The electric vehicle according to claim 1, wherein said frame is a longitudinal main frame of the electric vehicle.

3. The electric vehicle according to claim 1, wherein flow passage area of the branch ducts at distal positions with respect to said one end of the frame are smaller than flow passage areas of the branch ducts at proximal positions.

4. The electric vehicle according to claim 1, wherein each of said branch ducts include an elastic seal member.

5. An electric vehicle having a battery unit cooling system, comprising:

a longitudinal, hollow frame included in the electric vehicle;

a plurality of branch ducts branching from the frame and connected respectively to a plurality of battery units arranged along the frame; and a cooling fan connected to one end of the frame to cool the plurality of battery units in an induced-draft mode;

wherein a flow passage area of a branch duct furthest from said one end of the frame is smaller than those of the other branch ducts.

6. The electric vehicle according to claim 5, wherein said frame is a longitudinal main frame of the electric vehicle.

7. The electric vehicle according to claim 5, wherein flow passage areas of the branch ducts at distal positions with respect to said one end of the frame are smaller than flow passage areas of the branch ducts at proximal positions.

8. The electric vehicle according to claim 5, wherein each of said branch ducts include an elastic seal member.

* * * * *